Sept. 3, 1935.   C. R. H. BONN   2,013,126
CHANGE SPEED GEARING
Filed Jan. 26, 1934   3 Sheets-Sheet 1

Sept. 3, 1935.                C. R. H. BONN                2,013,126
                           CHANGE SPEED GEARING
                Filed Jan. 26, 1934            3 Sheets-Sheet 2

Inventor:
Carl Robert Hugo Bonn,
by Calvert Palmer,
Attorneys.

Sept. 3, 1935.  C. R. H. BONN  2,013,126
CHANGE SPEED GEARING
Filed Jan. 26, 1934  3 Sheets-Sheet 3

Inventor:
Carl Robert Hugo Bonn,
by Calvert Calvert
Attorneys.

Patented Sept. 3, 1935

2,013,126

UNITED STATES PATENT OFFICE 2,013,126

CHANGE SPEED GEARING

Carl Robert Hugo Bonn, Glasgow, Scotland

Application January 26, 1934, Serial No. 708,374
In Great Britain January 26, 1933

12 Claims. (Cl. 74—279)

This invention relates to variable speed gearing of the epicyclic gear type and includes an epicyclic variable speed gear in which the speed of the driven shaft is varied relatively to the speed of the driving shaft by an axially movable planet carrier operable in a pressure fluid circuit.

Desirably the planet carrier of each gear train presents the annulus of an adjacent gear train and is constituted by a disc which presents a brake surface adapted to engage a corresponding brake surface presented by an enclosing box or casing by being moved axially by pressure fluid. The planet carriers, operable in the pressure fluid circuit, may be moved axially upon actuation of inlet and exhaust valves adapted to control the fluid pressure applied to said carriers and which may be operatively connected together.

The pressure fluid circuit includes the inlet and exhaust valves, a pump, passage connections between said pump and valves, the epicyclic gear trains, the casing enclosing said trains, and a conduit connecting the one end of said casing to the suction side of said pump.

In the accompanying drawings Fig. 1 is a sectional view of an embodiment of epicyclic variable speed gearing according to the invention, the portion at the left hand side, which includes the pump and pump casing, being a section on a vertical plane and the remainder of the view, which includes the gear box, being a section on a horizontal plane.

Figure 1:
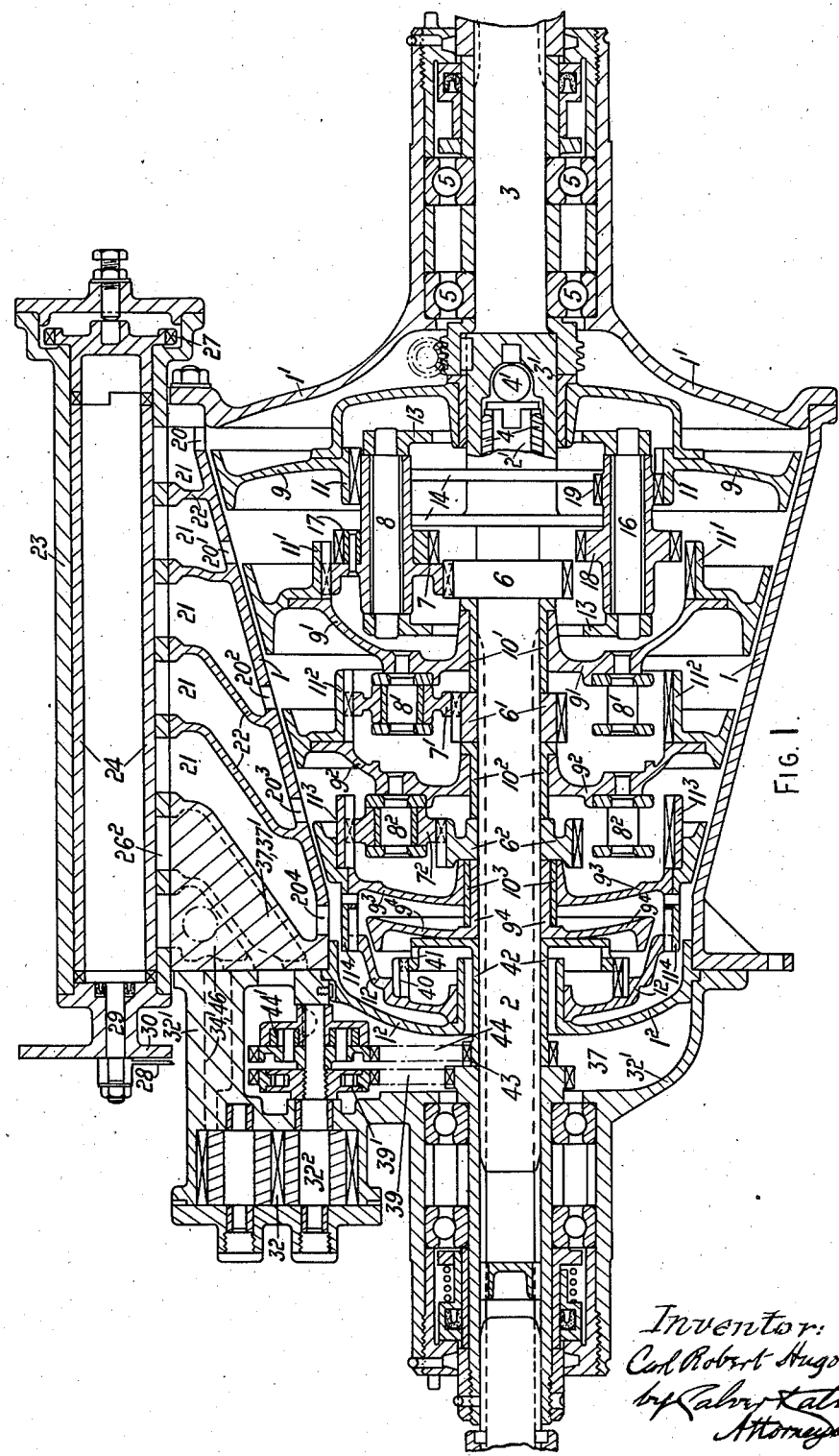

According to the embodiment of the invention illustrated by Fig. 1 epicyclic change speed gearing includes a casing 1 the inner surface of the annular wall of which is of truncated conical formation. The driving shaft 2 passes axially into the casing 1 from the end of smaller diameter and extends to near the end of larger diameter. The driven shaft 3 passes axially into the casing 1 from the end of larger diameter. Conveniently the end 2', of the driving shaft 2 is mounted in a socket 3' provided in the adjacent end of the driven shaft 3. Roller bearings 4 and an end-thrust ball bearing 4' may be interposed between the ends 2', 3' of the shafts 2 and 3 and said shafts may be supported by ball or like bearings 5 carried by the end walls of the casing 1.

A plurality of sun pinions 6, 6', $6^2$ are secured on the driving shaft 2 and gear with corresponding planet pinions 7, 7', $7^2$ of which the planet pinions 7' and $7^2$ are mounted for rotation on studs 8', $8^2$ carried, respectively, by disc members 9' and $9^2$ mounted for rotation and for axial movement on sleeves 10' and $10^2$ secured on the driving shaft 2. The discs 9' and $9^2$ each carry a toothed annulus 11' and $11^2$ with which, respectively, the planet pinions 7 and 7' engage. The pinion $7^2$ engages with a toothed annulus $11^3$ presented by a disc $9^3$ mounted for rotation and axially slidable on a sleeve $10^3$ mounted on the boss of a disc $9^4$ secured on the shaft 2. The disc $9^3$ also presents a toothed annulus $11^4$ the teeth of which mesh with a toothed wheel presented by a disc member 12 mounted for rotation and axially slidable on a stationary boss which may be presented by the end wall of the casing 1.

A cage, presented by rings 13, Figs. 1, 2, 3 and 4 is carried by the end 3' of the driven shaft 3 by means of plate members 14, the rings 13 and the plates 14 being secured together by bolts 15. Pairs of axle pins 8 and 16 extend between the rings 13. The planet pinions 7 are mounted on the axle pins 8 and secured to each pinion 7 is a pinion 17. On each axle pin 16 integral pinions 18 and 19 are mounted. The pinions 17 engage with the pinions 18. The pinions 19 gear with a toothed annulus 11 presented by a disc 9 mounted for rotation and axially slidable on the driven shaft 3. The peripheral surfaces of the discs 9, 9', $9^2$ and $9^3$ are of truncated conical formation to correspond to the formation of the inner surface of the annular wall of the casing 1 and the peripheral surface of the disc $9^4$ presents a truncated conical surface to correspond with a similar surface presented by the disc 12. Desirably, the discs 9, 9', $9^2$, $9^3$, $9^4$, and 12 are of dished formation.

The annular wall of the casing 1 is provided with a plurality of ports 20, 20', $20^2$, $20^3$, and $20^4$ through which pressure fluid, such as oil under pressure, is admitted to and exhausted from the casing 1 on one side or other of the discs 9, 9', $9^2$, or $9^3$.

The ports 20 to $20^4$ are open to compartments 21 presented by spaced walls 22 integral with the casing 1.

Figure 5:
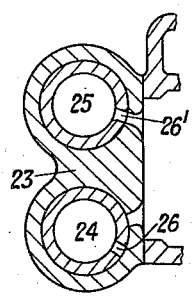
Fig. 5 is a fragmentary sectional elevation of the inlet and exhaust valves.

A valve box 23, Figs. 1 and 5, fitted against the compartments 21 is provided with an inlet valve 24 and an outlet or exhaust valve 25. The valves 24 and 25 are each constituted by a close-ended tube provided with spaced valve ports 26 and 26', there being an inlet valve port 26 and an exhaust valve port 26' for each compartment 21. The setting or arrangement of the ports is such that when one compartment is open to pressure fluid the adjacent compartment or compartments on the side towards the smaller end of the casing 1 is open to exhaust. The valves 24 and 25 are geared together by gear wheels 27. One valve, desirably the inlet valve 24, may be provided with a handle 28 secured on the valve spindle 29 and cooperative with a disc 30 whereby the position of the valve ports may be indicated. Angular movement of the valves 24 and 25, by means of the handle 28 admits or exhausts pressure fluid to one or other of the compartments 21.

Figure 2:
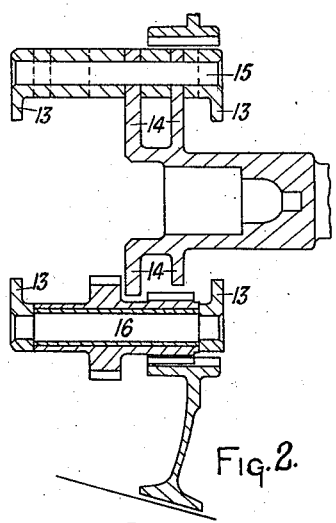
Fig. 2 is a fragmentary sectional elevation.
Figure 3:
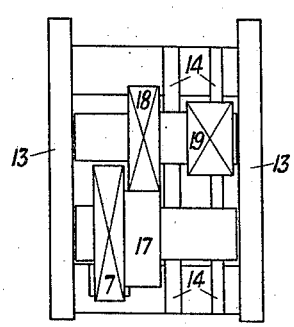
Fig. 3 is a diagrammatic plan and Fig. 4 is a diagrammatic end view illustrating the gearing for obtaining a reverse drive to the driven shaft.
Figure 4:
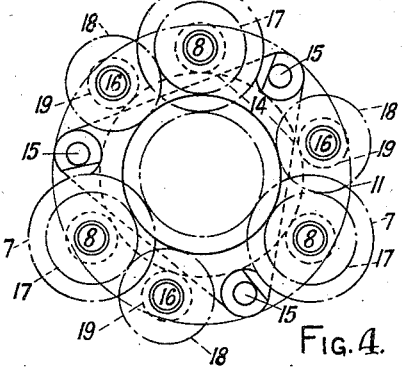
Figure 6:
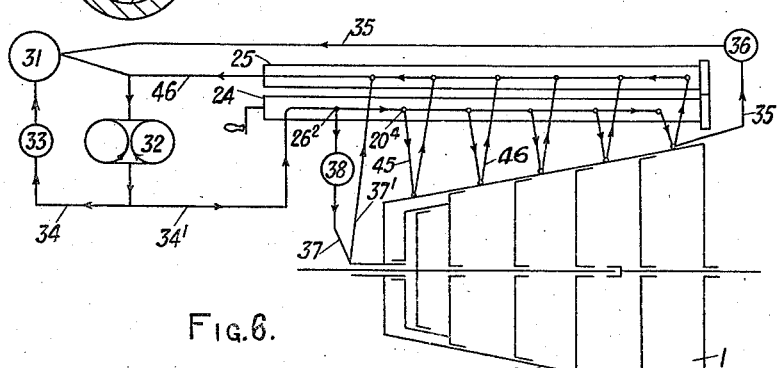
Fig. 6 is a diagram to illustrate the operation of the apparatus.
Figure 8:
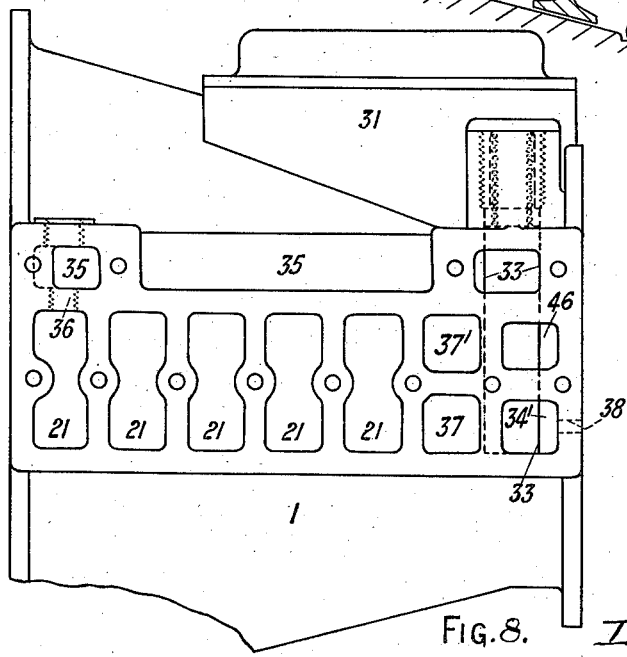

The pressure fluid which actuates the discs presenting the clutches is circulated in a pressure fluid circuit indicated diagrammatically by Fig. 6 which includes a tank 31 desirably carried by the casing 1, Figs. 6 and 8, a pump 32, Figs. 2 and 6, desirably carried by a casing 32' secured to the end wall $1^2$ of the casing 1, a pressure relief valve 33, Figs. 6 and 8, incorporated in a conduit 34 connecting the discharge side of the pump 32 and the tank 31, the inlet and exhaust valves 24 and 25 Figs. 1 and 8, a conduit 34' between the pump and inlet valve 24, an overflow conduit 35 connecting the larger end of the casing 1 with the tank 31, a constricted throat 36 presenting a nozzle to restrict the flow of pressure fluid through said overflow conduit 35, a chamber presenting a conduit 37 connecting the inlet valve 24 and the smaller end of the casing 1, a constricted throat 38 presenting a nozzle to restrict the flow of pressure fluid through said conduit 37, a chamber presenting a conduit 37' connecting the smaller end of the casing 1 and the exhaust valve 25, the ports 20 to $20^4$, the compartments 21 and the interior of the casing 1.

Desirably the pump 32 is driven from the shaft 2 by means of a train of gear wheels 39.

If desired and as shown, the disc 12 may present a toothed wheel 40 adapted to mesh with a toothed wheel 41 presented by a sleeve 42 loosely mounted on the shaft 2 and provided with a toothed wheel 43. A train of gear wheels 44 may be provided between the wheel 43 and the pump shaft $32^2$. Each gear train 39 and 44 is associated with a free-wheel pawl and ratchet device 39' and 44'. Conveniently the free-wheel devices 39' and 44' are fitted to the last wheel of their respective trains and the wheels constituting the trains are selected so that the last wheel of the train 39 rotates at a faster speed than the last wheel of the train 44.

Normally the pump shaft $32^2$ is driven from the main shaft 2 by means of the gear train 39 and as the last wheel of said gear train rotates faster than the last wheel of the gear train 44 the said gear train 44 runs idle, the pump shaft $32^2$ overrunning the last wheel of the gear train 44.

In the event of the power driving the shaft 2 failing or being cut-off and the driven shaft 3 continuing to rotate the pump shaft $32^2$ will be driven through the epicyclic gears in the casing 1, the last wheel of the gear train 44 taking up the drive to the pump shaft.

If desired the toothed wheel 40 presented by the disc 12, the toothed wheel 41 and the sleeve 42 may be dispensed with whereby the pump shaft $32^2$ may be driven only from the shaft 2 and in order that the direction of rotation of the shaft 2 may be reversed without reversing the direction of rotation of the pump shaft $32^2$ the toothed wheel 43 may be secured on the shaft 2, the pawl and ratchet free wheel devices being reversed, or the gear train 44 may include a gear wheel more than the gear train 39, whereby one gear train runs idle while the other is driving the pump shaft.

The flow of pressure fluid from the inlet valve 24 through the conduit 37 is controlled by a ring of ports $26^2$ Fig. 6, in said inlet valve, a port $26^2$ being provided to correspond to all positions of the inlet valve except the position presenting a solid drive wherein the pressure fluid is admitted to the casing 1 through the port $20^4$.

In operation the pump 32 circulates pressure fluid through the circuit, the relief valve 33 preventing excessive pressure.

In the free or neutral position of the epicyclic speed gearing pressure fluid circulated by the pump 32 passes through the conduit 34' to the inlet valve 24 and through the ports $26^2$, conduit 37 and nozzle 38 to the smaller end of the casing 1 whereby all the discs 9 to $9^3$ are moved to the disengaged or free position. The inlet and exhaust ports are all closed and the pressure fluid at the larger end of the casing 1 leaks back to the tank 31 through the conduit 35 and nozzle 36.

When the variable speed gearing is in top speed, presenting a solid drive between the driving and driven shafts the flow of pressure fluid from the inlet valve 24 through the conduit 37 and nozzle 38 is cut off by closure of the ports $26^2$ and pressure fluid passes from said inlet valve 24 as indicated in Fig. 8 by the line 45 through the port $20^4$ and is discharged to the exhaust valve 25 through the conduit indicated by the line 46 and 46' Fig. 6.

In other variable speed gear positions the conduit 37 including the nozzle 38 and the smaller end of the casing 1 are open to pressure fluid, one or other of the inlet ports 20 to $20^4$ and a corresponding exhaust port are open and the other inlet and exhaust ports are closed. In all cases the conduit 35, including the nozzle 36, from the larger end of the casing 1 to the tank 31 or pump suction is open.

When a disc is held by contact with the casing 1 the pressure fluid admitted through the nozzle 38 presses on any disc which may be "in" on the non-pressure side of the held disc and moves it to the free position, the fluid thus admitted ultimately escaping back to the pump suction by the open exhaust port. Similarly the pressure fluid admitted by the open pressure port presses on any disc which may be "in" on the pressure side of the held disc and moves it to the free position, pressure fluid passing these discs escaping back to the pump suction through the nozzle 36.

To obtain a reverse drive to the shaft 3 pressure fluid is admitted through the port 20 behind the disc 9 which is moved axially until its peripheral surface contacts with the inner surface of the annular wall of the casing 1. The disc 9 is thereby locked or clutched against rotation. Pressure fluid is exhausted through the port 20' and through the exhaust valve from the other side of the disc 9. On rotation of the driving shaft 2 the sun pinion 6 rotates the planet pinions 7 and therefore the pinions 17 on the axle pins 8. The pinions 17 rotate the pinions 18 and 19 on the axle pins 16 and as the annulus 11 is held against rotation the pinions on the axle pins perform an orbital movement round the shaft 2 thereby driving the cage which by means of the plates 14, drives the shaft 3 in the reverse direction to the shaft 2.

During the reverse drive when the disc 9 is held against rotation the other discs are free and idle.

To obtain a forward first speed drive the inlet and exhaust valves 24 and 25 are actuated whereby pressure fluid is admitted through the port 20', the port 20² being open to exhaust, so that the disc 9' is moved axially until its peripheral surface contacts with the casing 1. The disc 9' is thereby clutched against rotation and the other discs are free. The sun pinion 6 drives the planet pinion 7 and as the annulus 11' is stationary the pinion 7 performs an orbital movement whereby the cage, by means of the plates 14, drives the shaft 3 in the same direction as the shaft 2, the pinions 17, 18, and 19 being free and idle.

To obtain a forward second speed drive pressure fluid is admitted through the port 20² and the port 20³ is open to exhaust whereby the disc 9² is moved axially until its peripheral surface contacts with the casing 1. The disc 9² is thereby held against rotation and the other discs are free. The sun pinion 6' drives the planet pinion 7' which, as the annulus 11² is stationary performs an orbital movement and rotates the disc 9' which, by means of the annulus 11', imparts an orbital movement to the pinion 7' whereby, as the annulus 11 is free, the cage and therefore the driven shaft 3 are rotated.

To obtain a forward third speed drive pressure fluid is admitted through the port 20³ and the port 20⁴ is open to exhaust, whereby the disc 9³ is moved axially until its peripheral surface contacts with the casing 1. The disc 9³ is thereby held against rotation and the other discs are free. The sun pinion 6² drives the planet pinion 7² which, as the annulus 11³ is stationary, performs an orbital movement and rotates the disc 9² which by means of the annulus 11², imparts an orbital movement to the planet pinion 7' and rotates the disc 9' which by means of the annulus 11' imparts an orbital movement to the pinion 7 whereby, as the annulus 11 is free, the cage and the driven shaft 3 are rotated.

To obtain a forward fourth speed or solid drive, pressure fluid is admitted through the port 20⁴ and moves the disc 12 axially whereby the clutch surface of said disc clutches with the corresponding surface of the disc 9⁴ which is secured to the shaft 2. The disc 12 is in gear with the annulus 11⁴ of the disc 9³ and since all the discs 9 to 9³ are out of contact with the casing 1 and all the sun pinions are secured on the shaft 2 and in gear with the planet pinions the whole gear rotates as a unit or solid drive.

If desired the modification illustrated by Fig. 9 may be provided for obtaining a forward fifth speed drive.

Figure 7:
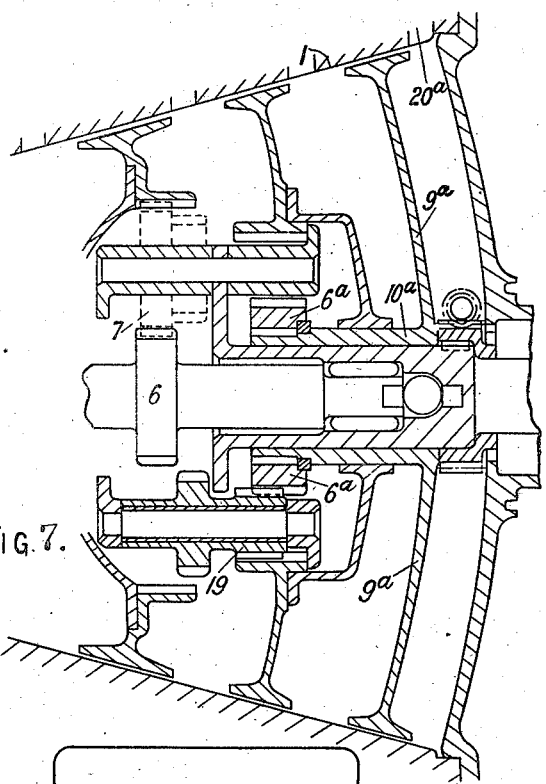
Fig. 7 is a fragmentary sectional elevation of a modification for obtaining a fifth or extra speed and Fig. 8 is an elevation of the gear casing at right angles to Fig. 1.

As shown by Fig. 7 an additional port 20ᵃ is provided at the larger end of the casing 1 behind an additional disc 9ᵃ carried by a sleeve 10ᵃ loosely mounted for axial movement on the end 3' of the driven shaft 3.

When pressure fluid is admitted through the port 20ᵃ the disc 9ᵃ is moved axially until it is clutched by the casing 1. A pinion 6ᵃ secured on the sleeve 10ᵃ is thereby held stationary and imparts to the planet pinions engaging therewith an orbital movement resulting in the rotation of the cage and driven shaft 3, the cage being rotated through the sun and planet pinions 6 and 7.

I claim:—

1. Variable speed gearing including an epicyclic gearing assembly interconnecting a driving shaft and a driven shaft, an axially movable planet carrier incorporated in said assembly, a casing enclosing said assembly, means for supplying pressure fluid to said casing, and means for controlling the supply of pressure fluid to said casing whereby said planet carrier is moved axially.

2. Variable speed gearing including an epicyclic gearing assembly interconnecting a driving shaft and a driven shaft, an axially movable disc member constituting a planet carrier incorporated in said assembly, a brake surface presented by said disc member, a casing enclosing said assembly, a brake surface presented by said casing and adapted to cooperate with the brake surface presented by the disc member, means for supplying pressure fluid to said casing and means for controlling the supply of pressure fluid to said casing whereby said disc is moved axially.

3. Variable speed gearing including an epicyclic gearing assembly interconnecting a driving shaft and a driven shaft, axially movable disc members constituting planet carriers incorporated in said assembly, a brake surface presented by the periphery of each disc member, a casing enclosing said assembly, a brake surface presented by said casing and adapted to cooperate with the brake surfaces presented by the disc members, means for supplying pressure fluid to said casing and means for controlling the supply of pressure fluid to said casing whereby one of said discs is moved axially.

4. Variable speed gearing including an epicyclic gearing assembly interconnecting a driving shaft and a driven shaft, axially movable planet carriers incorporated in said assembly and adapted to be held against rotation or left free to rotate, a casing enclosing said assembly, a pump for supplying pressure fluid to said casing and means for controlling the supply of pressure fluid to said casing whereby said planet carriers may be maintained in the free position by pressure fluid admitted to one end of said casing, the other end of which is open to the pump suction.

5. Variable speed gearing including an epicyclic gearing assembly interconnecting a driving shaft and a driven shaft, an axially movable planet carrier incorporated in said assembly, a casing enclosing said assembly, means for supplying pressure fluid to said casing, and means for controlling the supply of pressure fluid to said casing whereby said planet carrier is moved axially to divide said casing into compartments whereby one of which may be open to pressure fluid and another of which may be open to exhaust.

6. Variable speed gearing interconnecting a driving shaft and a driven shaft and comprising an assembly of epicyclic gear trains each of which incorporates an axially movable planet carrier and an annulus, the planet carrier of one train presenting the annulus of an adjacent gear train, a brake surface presented by the periphery of each planet carrier, a casing enclosing said assembly, a brake surface presented by said casing and adapted to co-operate with the brake surfaces presented by the planet carriers, means for supplying pressure fluid to said casing whereby said planet carrier is moved axially for co-operation of the brake surfaces, and means for controlling the supply of pressure fluid to said casing.

7. Variable speed gearing including an epicyclic gearing assembly interconnecting a driving shaft and a driven shaft, an axially movable disc member constituting a planet carrier incorporated in said assembly, a brake surface presented by said disc member, an annular wall and end walls which constitute a casing enclosing said assembly, a brake surface presented by said annular wall and adapted to co-operate with the brake surface presented by the disc member, ports formed in said annular wall, means for supplying pressure fluid through said ports to said casing and valves adapted to control the flow of pressure fluid through said ports, whereby said disc is moved axially for co-operation of the brake surfaces.

8. Variable speed gearing including an epicyclic gearing assembly interconnecting a driving shaft and a driven shaft, an axially movable disc member constituting a planet carrier incorporated in said assembly, a brake surface presented by said disc member, an annular wall and end walls which constitute a casing enclosing said assembly, a brake surface presented by said annular wall and adapted to co-operate with the brake surface presented by the disc member, ports formed in said annular wall, means for supplying pressure fluid through said ports to said casing, inlet and exhaust valves adapted to control the flow of pressure fluid through said ports, whereby said disc member is moved axially for co-operation of the brake surfaces and means for operatively interconnecting said valves.

9. Variable speed gearing including an epicyclic gearing assembly interconnecting a driving shaft and a driven shaft, an axially movable planet carrier incorporated in said assembly, a brake surface presented by said planet carrier, a casing enclosing said assembly, a brake surface presented by said casing and adapted to co-operate with the brake surfaces presented by the planet carrier, a pump for supplying pressure fluid to said casing, operatively connected inlet and exhaust valves for controlling the pressure fluid supply to and exhaust from said casing, whereby said planet carrier is moved axially for co-operation of the brake surfaces, and a conduit connecting the one end of said casing and the suction side of said pump.

10. Variable speed gearing including an epicyclic gearing assembly interconnecting a driving shaft and a driven shaft, an axially movable planet carrier incorporated in said assembly, a brake surface presented by said planet carrier, a casing enclosing said assembly, a brake surface presented by said casing and adapted to co-operate with the brake surfaces presented by the planet carrier, a pump for supplying pressure fluid to said casing, operatively connected inlet and exhaust valves for controlling the pressure fluid supply to and exhaust from said casing, whereby said planet carrier is moved axially for co-operation of the brake surfaces, a conduit connecting the one end of said casing and the suction side of said pump and a constricted nozzle incorporated in said conduit.

11. Variable speed gearing including an epicyclic gearing assembly interconnecting a driving shaft and a driven shaft, an axially movable planet carrier incorporated in said assembly, a brake surface presented by said planet carrier, a casing enclosing said assembly, a brake surface presented by said casing and adapted to co-operate with the brake surfaces presented by the planet carrier, a pump for supplying pressure fluid to said casing, operatively connected inlet and exhaust valves for controlling the pressure fluid supply to and exhaust from said casing, whereby said planet carrier is moved axially for co-operation of the brake surfaces, a passage connecting said inlet valve and an end of the casing and a constricted nozzle incorporated in said passage.

12. Variable speed gearing including an epicyclic gearing assembly interconnecting a driving shaft and a driven shaft, a casing enclosing said assembly, a pump for supplying pressure fluid to said casing, a gear train interconnecting the driving shaft of the gearing assembly and the pump shaft, a sleeve loosely mounted on the driving shaft of the gearing assembly and adapted to be driven through gears from the driven shaft of said assembly, a second gear train interconnecting said sleeve and the pump shaft, and a pawl and ratchet free-wheel device incorporated in each of said gear trains whereby when one of said trains drives the pump shaft the other gear train runs idle.

CARL ROBERT HUGO BONN.